Feb. 22, 1966   C. J. IBEX   3,236,196
METHOD FOR PREPARING FRIED EDIBLES
Filed Feb. 7, 1963

CHARLES IBEX
INVENTOR.

BY
Donald M. Sandler
ATTORNEY

United States Patent Office 3,236,196
Patented Feb. 22, 1966

---

3,236,196
METHOD FOR PREPARING FRIED EDIBLES
Charles J. Ibex, Baltimore, Md., assignor to Harry Sandler, doing business as R-Good Cake Cone Co., Baltimore, Md.
Filed Feb. 7, 1963, Ser. No. 256,900
8 Claims. (Cl. 107—54)

This invention relates to a method for preparing, from dough, a fried edible (such as a doughnut or the like) which has a predetermined configuration.

Edibles of the class described are conventionally prepared by extruding a piece of dough into a vat of suitably heated frying liquid, and frying the dough to the desired degree. Those skilled in the art have recently made available on the commercial market, edibles of the class described which are in a semi-cooked or completely cooked but frozen state such that the completion of the cooking process, or thawing and heating, is left to the individual. Such completion is conventionally carried out in a domestic oven. However, when an individual wishes to prepare only one or two of the edibles it would be more convenient from his standpoint to utilize a standard pop-up toaster instead of an oven. The difficulty with this approach can be understood from a consideration of the process by which the edible is formed. The unconstrained manner in which the raw dough is conventionally cooked by the frying liquid precludes quantity production of edibles into a configuration sufficiently uniform to fit into the apertures of a domestic pop-up type toaster. Therefore, prior to this invention, only chance determined whether an individual could quickly and easily prepare one or two of the edibles in a toaster. For a society in which electric toothbrushes are preferred to ordinary toothbrushes because of the labor saving feature of the former, where aerosol dispensers of shaving cream are touted for the number of seconds saved over the use of an ordinary shaving brush and soap—in short, where time is of the essence, the heating up of an oven (even those with self-lighting features) for one to enjoy a doughnut with one's morning coffee borders on the barbaric.

It is accordingly a primary object of this invention to solve the irritable nature of the early riser by providing a method for controlling the configuration of edibles of the class described such that they can easily be slipped into a toaster, thereby avoiding both an offense to the finger apt to arise when too large an edible is sliced preparatory to toasting the halves, and the offense to the nose when too large an edible, having been brutally forced into a toaster, is reduced to elemental carbon.

Briefly, the invention contemplates the use of a mold having therein, an enclosed cavity of a configuration adequate to permit an edible of such configuration to easily fit within the aperture of a domestic pop-up type toaster. Such mold is fashioned of porous material, such as sintered metal or the like, capable of percolating frying liquids, commonly used to cook edibles of the type described, into the cavity of the mold. The nature of the material permits the frying liquid to be absorbed thereinto to fry the edible without permitting the absorption of the more viscous dough contained in the cavity.

The more important features of this invention have thus been outlined rather broadly in order that the detailed description thereof that follows may be better understood, and in order that the contribution to the art may be better appreciated. There are, of course, additional features of this invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 2:
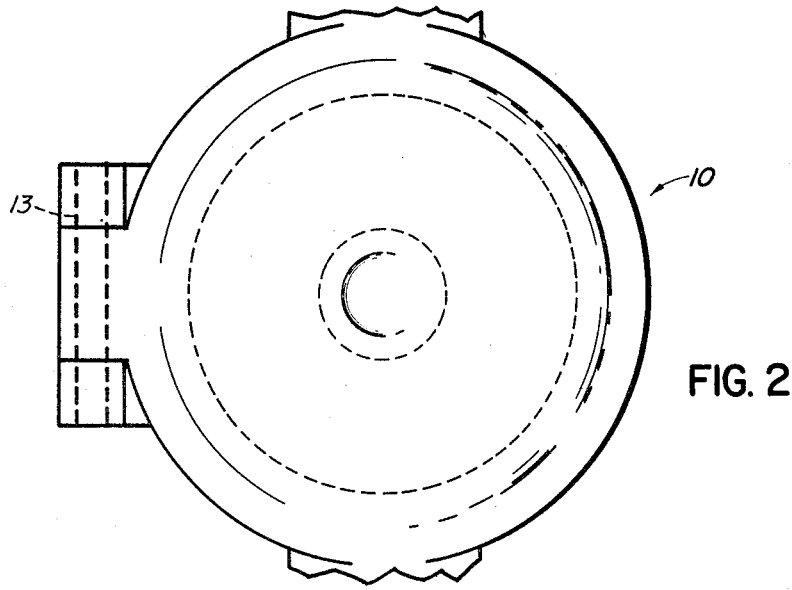
FIGURE 2 is a top view of the mold of FIGURE 1.
Figure 1:
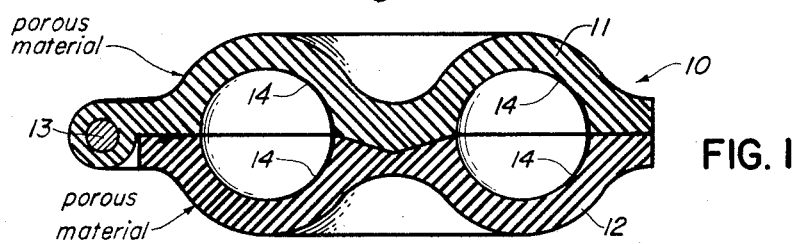
FIGURE 1 is a sectional view of a mold formed of a porous material capable of percolating a frying liquid, and having an enclosed cavity of predetermined configuration.
Figure 3:
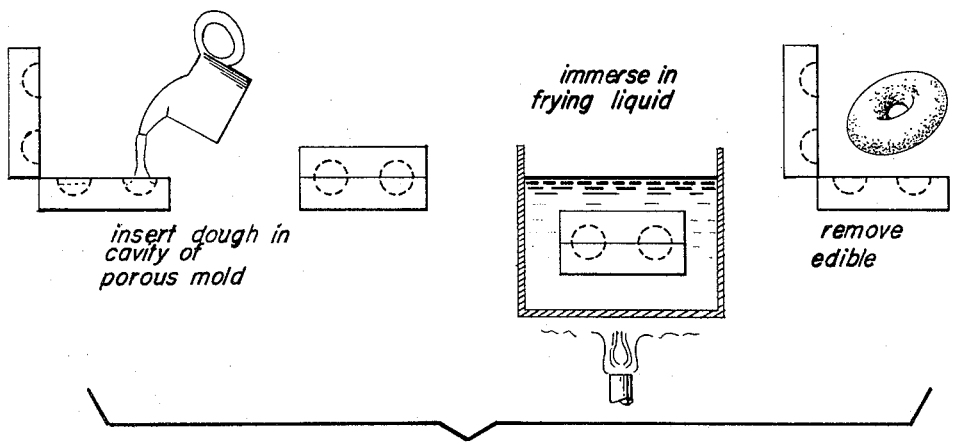
FIGURE 3 is a schematic flow chart showing the process of inserting dough into the cavity, and immersing the mold containing the dough into a frying liquid.

Referring now to FIGURE 1, mold 10 made in accordance with the present invention includes top portion 11 and bottom portion 12 hingedly connected at 13 along an adjacent edge. Each portion contains a depression 14 of predetermined configuration, in this case toroidal, but any other configuration could of course be used. When the mold is closed, the portions are in operative position in contacting registration to define an enclosed cavity of said predetermined configuration. The inoperative position of the portions occurs when they are out of contacting registration; i.e., the mold is open.

The material of the mold is highly critical in successfully frying dough contained in the enclosed cavity of the mold. This is not to say that there is a single, or but a few materials suitable. Rather, what is meant is that the type of material is critical. By this is meant the material must be suitable to exactly define the configuration of the edible and still be capable of effecting its frying. Essentially, these requirements would appear to be in conflict since the first requirement leads to a solid metallic mold, while the second leads to a basket type of mold. A solid mold would define the proper configuration but would bake the edible instead of frying it; while a basket type of mold would effect frying but would not define the proper configuration.

The dilemma is resolved by utilizing a porous material such as sintered metal, a porous ceramic, or the like. Such material has fine intersticial spacings which permit the frying liquid to percolate from the exterior thereof into the cavity as distinguished from flowing through as would be the case with a wire basket or the like. While the interticial spacing effects the passage of frying liquid, it seems to block absorption of the thicker, more viscous dough contained in the cavity.

A mold fashioned of sintered metal and available for the purpose of filtering from a liquid material in the range from twenty to sixty microns held in suspension therein is found to give highly satisfactory results.

While the drawing illustrates the insertion of dough into the mold while the latter is open, this is intended to indicate the process step, it being obvious that injection of a pre-selected amount of dough into the cavity while the mold is closed would be advantageous. The preferred amount of dough inserted into the cavity during this step in the process is no more than sufficient to fill the cavity after the dough is fried to the degree desired, since this amount will insure that the expansion of the dough in the cavity during the frying process described below will not significantly extrude dough along the parting line of the mold. Flash around the finished product is thus minimized. Obviously, the tolerance of the observer to an edible whose exterior is only partially formed by the mold, or which has a flash defining the parting line, will be the factor which determines the exact amount of dough that is inserted into the cavity. After insertion of the dough, the mold with the dough contained in the cavity is immersed in heated frying liquid. The latter percolates through the mold into contact with the dough in the cavity, causing the dough to be fried just as is the case of edibles extruded directly into the frying liquid. When fried to the desired degree, the mold is removed, opened, and the fried edible removed. The result is an edible having a predetermined thickness such that quantity production of identical edibles becomes possible.

While a conventional toroidal configuration is illustrated, those skilled in the art will appreciate the opportunities presented by this invention whereby novel shapes, such as doughnuts with handles for dunking purposes, are easily produced.

What is claimed is:

1. A method for preparing from dough a fried edible, such as a doughnut or the like, which has a predetermined configuration comprising the steps of:
    (a) inserting dough into an enclosed cavity of said predetermined configuration in a mold made of material capable of absorbing the frying liquid but rejecting absorption of dough; and
    (b) immersing said mold with the dough in the cavity therein in a frying liquid until the dough is fried to the desired degree.

2. The method of claim 1 wherein said mold is of sintered metal.

3. The method of claim 1 wherein said mold is a porous ceramic.

4. The method for preparing from dough a fried edible, such as a doughnut or the like, which has a predetermined fixed configuration comprising the steps of:
    (a) inserting dough into an enclosed cavity of said predetermined configuration in a porous mold constructed and arranged to absorb frying liquid but to reject absorption of the dough; and
    (b) immersing said mold with the dough in the cavity therein in said frying liquid until the latter is absorbed into the mold and fries the dough to the desired degree.

5. The method for preparing from dough a fried edible, such as a doughnut or the like, which has a predetermined fixed configuration comprising the steps of:
    (a) providing a mold of porous material capable of absorbing frying liquid and having an enclosed cavity therein of predetermined configuration;
    (b) inserting into said cavity a quantity of dough sufficient to no more than fill said cavity after the dough is fried to the desired degree; and
    (c) immersing said mold with the dough in the cavity therein in frying liquid until the latter is absorbed into the material of said mold and fries the dough to the desired degree.

6. A method for preparing from dough a fried edible, such as a doughnut or the like, which has a predetermined configuration comprising the steps of:
    (a) inserting dough into an enclosed cavity of said predetermined configuration in a mold made of porous material capable of filtering from the frying liquid material in the range from twenty to sixty microns held in suspension therein; and
    (b) immersing said mold with the dough in the cavity therein in a frying liquid until the dough is fried to the desired degree.

7. A method for preparing from dough a fried edible, such as a doughnut or the like, which has a predetermined configuration comprising the steps of:
    (a) inserting dough into an enclosed cavity of said predetermined configuration in a mold made of porous material capable of filtering from the frying liquid material in the range from twenty to sixty microns held in suspension therein; and
    (b) percolating frying liquid into contact with the dough in the cavity until the dough is fried to the desired degree.

8. A method for preparing from dough a fried edible, such as a doughnut or the like, which has a predetermined configuration comprising the steps of:
    (a) inserting dough into an enclosed cavity of said predetermined configuration in a mold made of porous material capable of percolating a frying liquid; and
    (b) percolating a frying liquid into contact with the dough in said cavity until the dough is fried to the desired degree.

References Cited by the Examiner

UNITED STATES PATENTS

| | | | |
|---|---|---|---|
| 137,142 | 3/1873 | Machlett | 99—403 |
| 682,515 | 9/1901 | Allard | 99—439 |
| 1,009,953 | 11/1911 | Boyle | 99—109 |
| 1,663,719 | 3/1928 | Morley | 107—54.21 |
| 1,888,928 | 11/1932 | Lewis | 99—428 |
| 2,013,337 | 9/1935 | Bordas | 99—428 |
| 2,263,490 | 11/1941 | Fox | 107—54.21 |

WALTER A. SCHEEL, *Primary Examiner.*

CHARLES A. WILLMUTH, WILLIAM B. PENN, ROBERT E. PULFREY, *Examiners.*